United States Patent
Pavlik et al.

(10) Patent No.: US 6,913,254 B2
(45) Date of Patent: *Jul. 5, 2005

(54) LOCATING ASSEMBLY HAVING AN EXTENDABLE CLAMPING FINGER

(75) Inventors: Joseph M. Pavlik, Rochester Hills, MI (US); Douglas J. Holt, Livonia, MI (US); Robert C. Adams, Jr., Romeo, MI (US)

(73) Assignee: Welker Bearing Company, Troy, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 10/859,246

(22) Filed: Jun. 2, 2004

(65) Prior Publication Data

US 2004/0217529 A1 Nov. 4, 2004

Related U.S. Application Data

(63) Continuation of application No. 10/616,360, filed on Jul. 9, 2003, now Pat. No. 6,786,478.
(60) Provisional application No. 60/394,841, filed on Jul. 10, 2002.

(51) Int. Cl.[7] .................................................. B23Q 1/00
(52) U.S. Cl. ......................................... 269/49; 269/32
(58) Field of Search ........................ 269/49, 32, 91–94, 269/228, 237, 244, 24, 48.1

(56) References Cited

U.S. PATENT DOCUMENTS

| | | | |
|---|---|---|---|
| 4,496,138 A | 1/1985 | Blatt | |
| 4,905,973 A | 3/1990 | Blatt | |
| 5,067,606 A | 11/1991 | Schlatter et al. | |
| 5,125,632 A | 6/1992 | Blatt et al. | |
| 5,165,670 A | 11/1992 | Sawdon | |
| 5,271,651 A | 12/1993 | Blatt et al. | |
| 5,303,908 A | 4/1994 | Halder | |
| 5,575,462 A | 11/1996 | Blatt | |
| 5,697,752 A | 12/1997 | Dugas et al. | |
| 5,762,325 A | 6/1998 | Blatt | |
| 5,823,519 A | 10/1998 | Tunkers | |
| 5,845,897 A | 12/1998 | Tunkers | |
| 5,845,898 A | 12/1998 | Halder et al. | |
| 5,938,257 A | 8/1999 | Blatt | |
| 6,059,277 A | 5/2000 | Sawdon et al. | |
| 6,102,383 A | 8/2000 | Tunkers | |
| 6,220,588 B1 | 4/2001 | Tunkers | |
| 6,357,735 B2 | 3/2002 | Haverinen | |
| 6,362,547 B1 | 3/2002 | Peterson et al. | |
| 6,378,855 B1 | 4/2002 | Sawdon et al. | |
| 6,439,560 B2 | 8/2002 | Sawada et al. | |
| 6,648,316 B1 | 11/2003 | Vouland | |
| 6,695,359 B2 | 2/2004 | Morel et al. | |
| 6,698,736 B2 | 3/2004 | Dugas et al. | |
| 6,786,478 B2 * | 9/2004 | Pavlik et al. | 269/49 |

* cited by examiner

*Primary Examiner*—Lee D. Wilson
(74) *Attorney, Agent, or Firm*—Howard & Howard

(57) ABSTRACT

The subject invention provides a locating assembly for centering and securing a work piece. The locating assembly includes a body. The body defines an internal cavity and an opening from the cavity to the exterior of the body. A locating pin is disposed in the cavity and extends along an axis out of the opening. An actuator moves the locating pin rectilinearly along the axis. A pair of fingers are supported by the locating pin and move radially into and out of the locating pin, transversely to the axis. A central post rotates in response to the rectilinear movement of the locating pin. A dowel extends from an end of the central post into a slot in the finger. The central post moves the dowel in an arcuate path through the slot to radially move the finger simultaneous with the rectilinear movement of the locating pin.

6 Claims, 8 Drawing Sheets

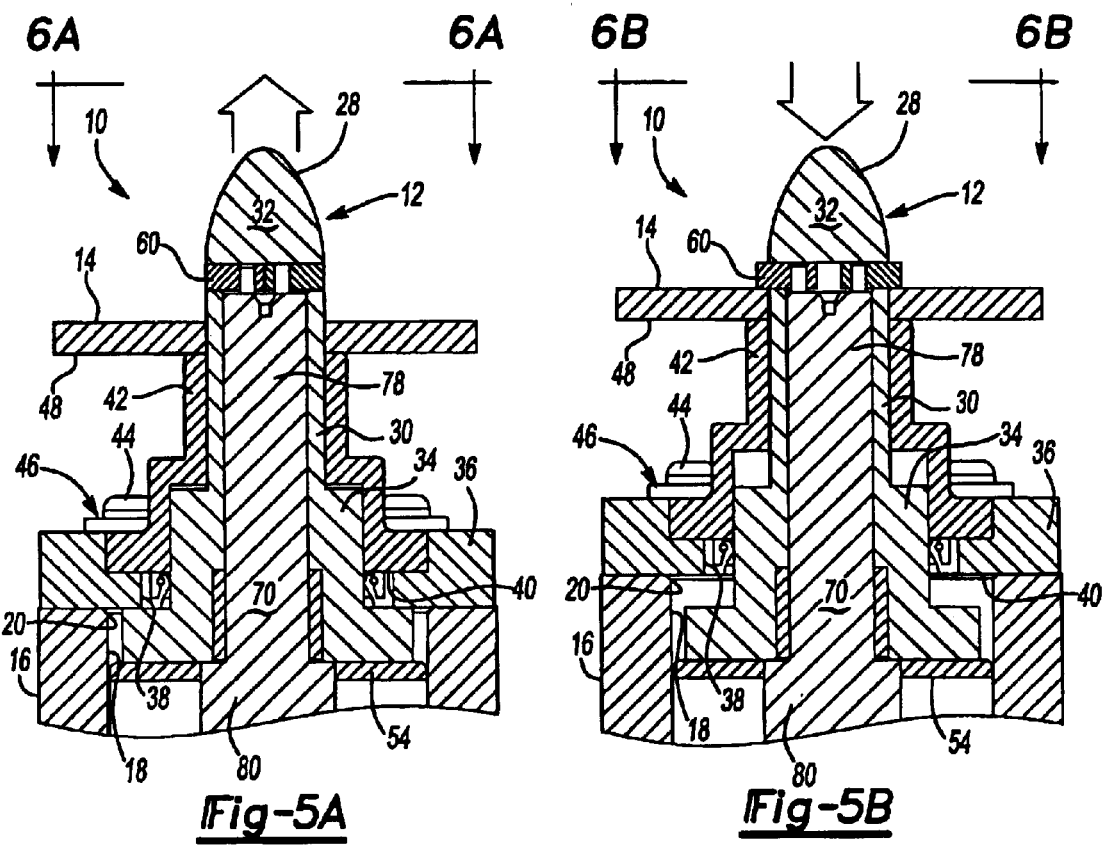
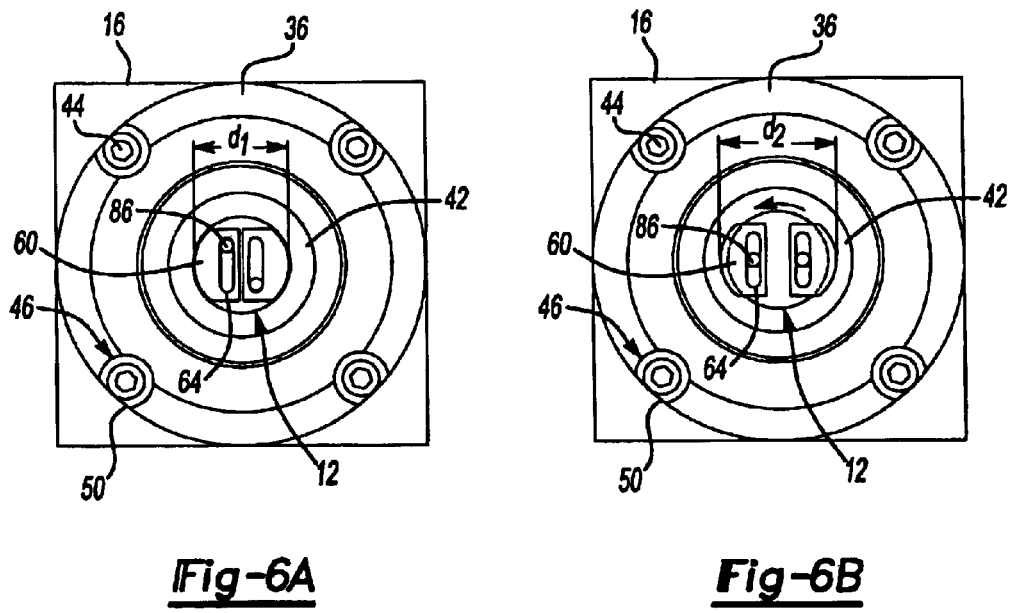
Fig-5A    Fig-5B
Fig-6A    Fig-6B

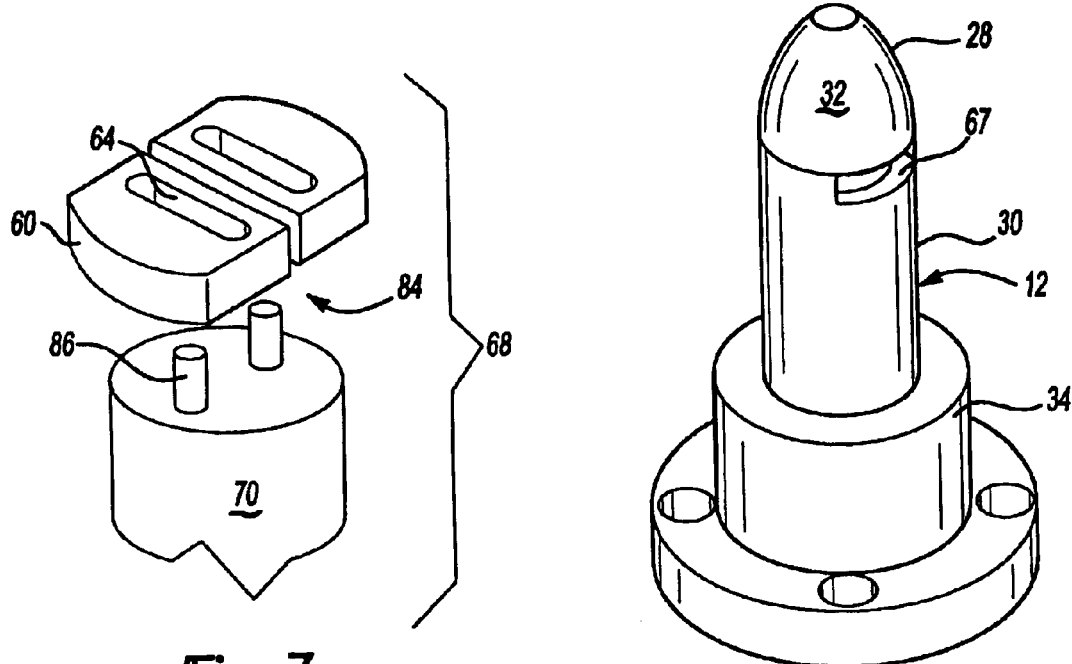
Fig-7
Fig-8
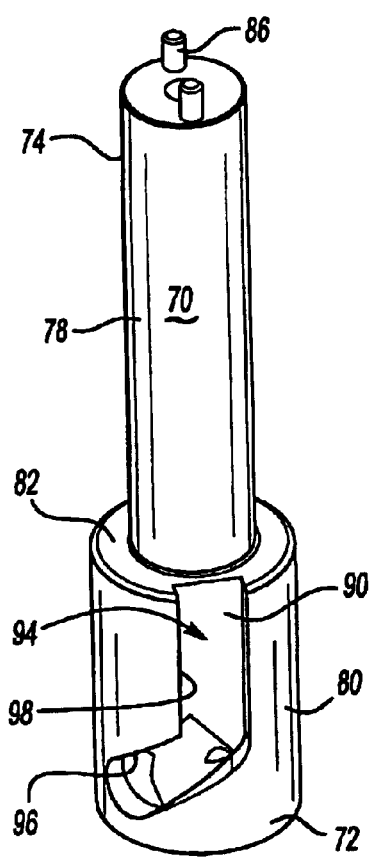
Fig-9
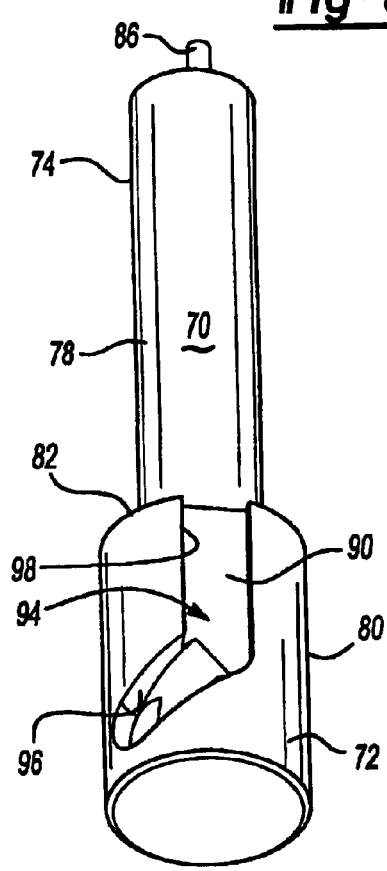
Fig-10

LOCATING ASSEMBLY HAVING AN EXTENDABLE CLAMPING FINGER

RELATED APPLICATIONS

This application is a continuation of U.S. Non-Provisional patent application Ser. No. 10/616,360, which was filed on Jul. 9, 2003 now U.S. Pat. No. 6,786,478, which claims priority to and all advantages of U.S. Provisional Patent Application No. 60/394,841, which was filed on Jul. 10, 2002.

BACKGROUND OF THE INVENTION

1. Field of the Invention

The subject invention generally relates to locating pins for inserting into a work piece to position and hold the work piece. More specifically, the subject invention relates to a locating pin having an extendable finger or fingers for holding the work piece in place and for retracting into the locating pin to allow the work piece to be removed from the locating pin.

2. Description of the Prior Art

Various locating assemblies are known to those skilled in the art which employ a locating pin to precisely position a work piece. These locating assemblies include an extendable clamping arm, or finger, to hold the work piece in place, as illustrated in U.S. Pat. No. 6,378,855 to Sawdon et al.

The '855 patent to Sawdon et al discloses a locating assembly having a housing and a locating pin. A steel shaft inside the housing has a pair of hooks. The pair of hooks are extendable from the locating pin through a pair of vertical slots. A first dowel passes through a slot of the steel shaft and is attached to the housing. A second dowel runs through a bottom of the steel shaft. A pneumatic piston has a slot for receiving the second dowel and for controlling the steel shaft as the pneumatic piston is moved.

A clamping cycle begins when the pneumatic piston is moved in a horizontal direction, guiding the second dowel through the slot in the pneumatic piston and moving the steel shaft. As the steel shaft moves, the slot in the steel shaft moves along the first dowel, thus guiding the shaft. The first and second slots are shaped such that as the pneumatic piston is moved, the steel shaft is forced out of the locating pin and pulled in a downward vertical direction to hold the work piece with the hooks.

The locating assembly disclosed in the '855 patent, among other similar locating assemblies of the prior art, is expensive and difficult to maintain. For instance, the hook disclosed in the '855 patent, while being subjected to forces in many directions, is prone to failure due to fatigue. Furthermore, the hooks are limited to a single path of motion, depending on a shape of the first and second slots, and thus cannot be adjusted. This may result in too great of a clamping force being applied to the work piece, causing denting, or conversely, too little clamping force, allowing the work piece to move while being worked on. When using multiple clamping devices, clamping forces at each device may vary, resulting in clamping that is not uniform, damage to the work piece, or movement of the work piece while being worked on. The locating assemblies of the prior art also require extra time to both extend out of the locating pin and then clamp down on the work piece. The extra time cuts down on production speeds and reduces efficiency.

Thus, it would be advantageous to provide a locating assembly that may be adjusted to provide an ideal clamping force on work pieces of various thickness. It would also be advantageous to provide a locating assembly having extendable fingers that are less susceptible to failure to eliminate aspects of existing locating assemblies that require extensive maintenance, thus streamlining manufacturing operations. It would also be advantageous to provide a locating assembly capable of working faster, more efficiently, more precisely, and more uniformly by extending and retracting at least one finger from the locating pin simultaneous with a downward movement of the locating pin. It would also be advantageous for these extendable fingers to have minimal gaps around them so that no foreign materials or contamination enters and destroys the internal mechanism.

SUMMARY OF THE INVENTION AND ADVANTAGES

The subject invention provides a locating assembly including a body. The body defines an internal cavity and an opening from the cavity to the exterior of the body. A locating pin is disposed in the cavity. The locating pin extends along an axis out of the opening to a distal end. An actuator moves the locating pin rectilinearly along the axis into and out of the opening. At least one finger is supported by the locating pin adjacent to the distal end. The finger moves radially into and out of the locating pin, transversely to the axis of the locating pin. A mechanism rotates in response to the rectilinear movement of the locating pin for moving the finger radially.

The locating assembly, through the mechanism, precisely controls the finger so that the locating assembly works faster, more efficiently, more precisely, and more uniformly by extending and retracting the finger through the locating pin simultaneous with the rectilinear movement of the locating pin. Furthermore, the locating assembly does not require extensive maintenance, thus making manufacturing operations more efficient. The locating assembly is also self compensating to provide an ideal clamping force on work pieces of various size. Thus, when multiple locating assemblies are used, each assembly is self compensating to provide a uniform clamping force on the work piece.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5A is a fragmentary cross-sectional view of the locating assembly including the locating pin in an "unclamped" position and having fingers retracted inside the locating pin;

FIG. 5B is a fragmentary cross-sectional view like FIG. 5A but showing the locating pin in the "clamped" position and having the fingers extended from the locating pin;

FIG. 6A is a sectional top view of the locating assembly taken along line 6A—6A of FIG. 5A showing the fingers retracted inside the locating pin;

FIG. 6B is a sectional top view of the locating assembly taken along line 6B—6B of FIG. 5B showing the fingers extended from the locating pin;

FIG. 7 is a fragmentary exploded view of the fingers, dowels, and the central post;

FIG. 8 is a perspective view of the locating pin including the pin mount;

FIG. 9 is a perspective view of the top of the central post showing the dowels and defining the cam slot;

FIG. 10 is a perspective view of the bottom of the central post showing the cam slot;

DETAILED DESCRIPTION OF THE PREFERRED EMBODIMENT

Figure 1A:
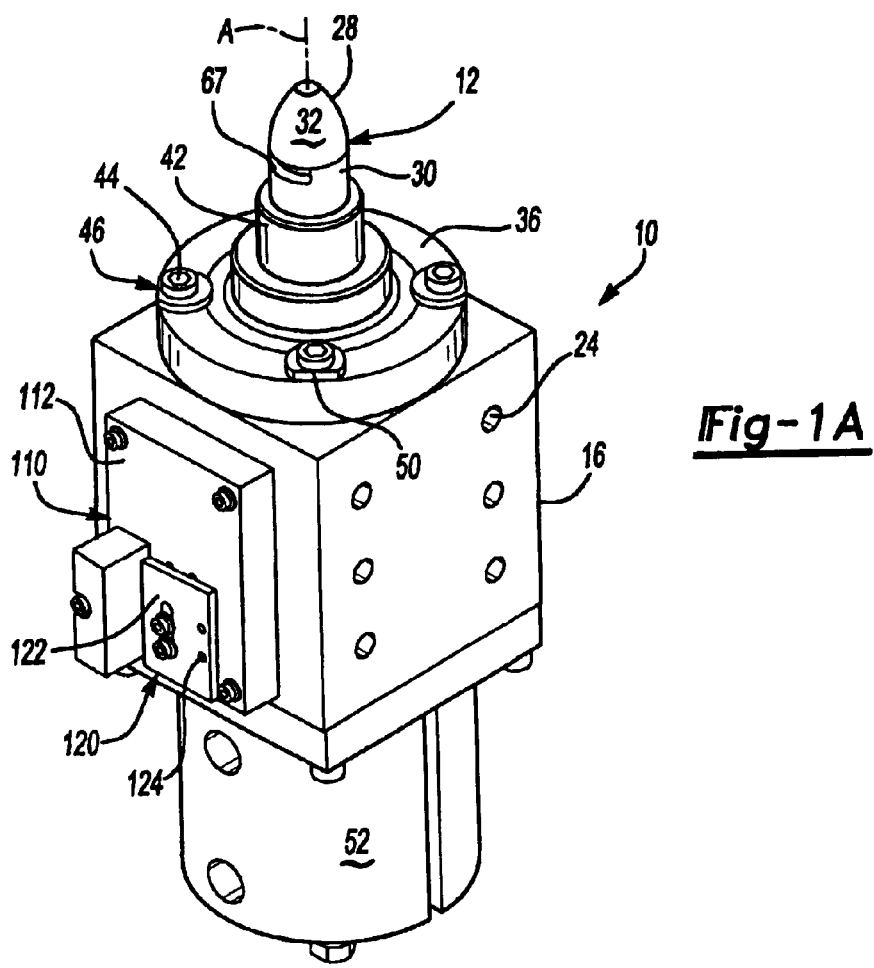
FIG. 1A is a perspective view of the locating assembly.
Figure 1B:
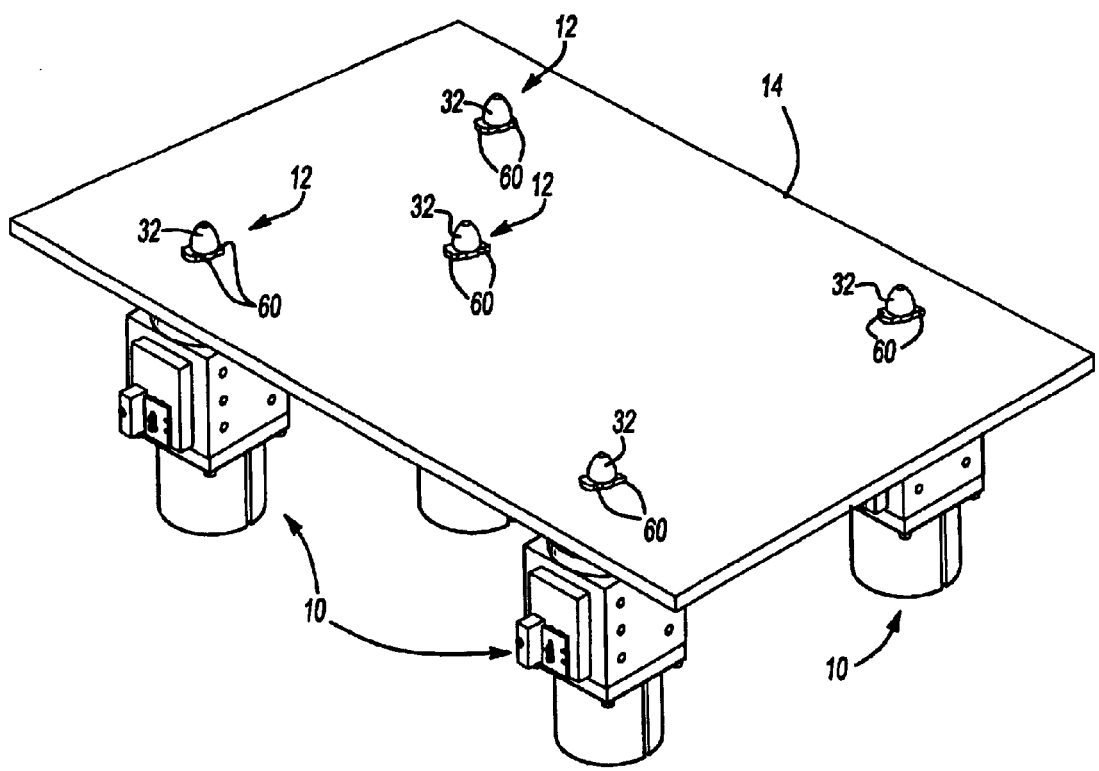
FIG. 1B is a perspective view of a work piece with the locating pins in the "clamped" position.

Referring to the Figures, wherein like numerals indicate like or corresponding parts throughout the several views, a locating assembly is generally shown at 10 in FIG. 1A. The locating assembly 10 includes a locating pin 12 that, as shown in FIG. 1B, positions and holds a work piece 14 so that work can be performed on the work piece 14. For example, the work piece 14 may be traveling on an assembly line to various stations, where work is performed on the work piece 14. The locating pin 12 precisely positions and holds the work piece 14 so that a person or machine performing the work may do so without the work piece 14 moving out of place. Preferably, the locating assembly 10 is located at the station. Upon arrival at the station, the work piece 14, which preferably defines a locating hole for receiving the locating pin 12, is placed on the locating assembly 10. The locating assembly 10 holds the work piece 14 with the locating pin 12 through the locating hole. Alternatively, the locating assembly 10 may hold the work piece 14 with the locating pin 12 along an edge of the work piece 14. After completion of the work, the locating assembly 10 releases the work piece 14. Alternatively, the locating assembly 10 may move with the assembly line to accompany the work piece 14 as the work piece 14 travels to the various stations. In the alternative scenario, the locating assembly 10 holds the work piece 14 at a beginning of the assembly line and releases the work piece 14 at an end of the assembly line. It is to be appreciated that the locating assembly 10 may be used independent of an assembly line for a variety of purposes.

Figure 11:
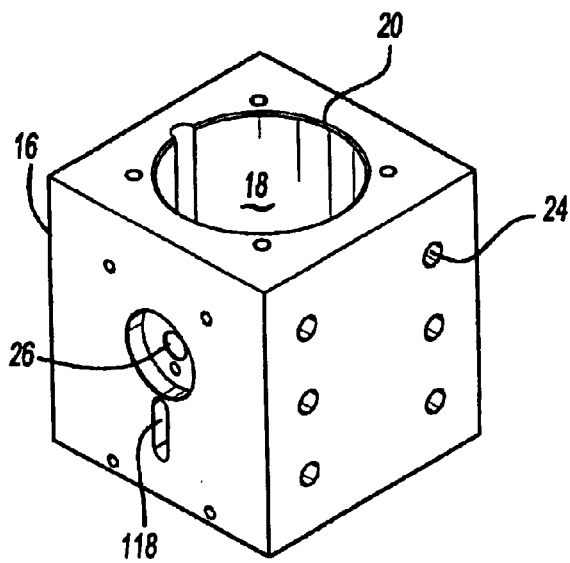
FIG. 11 is a perspective view of the body.

The locating assembly 10 includes a body 16 for housing components of the locating assembly 10. As shown in FIG. 11, the body 16 defines an internal cavity 18 and an opening 20 from the cavity 18 to the exterior of the body 16. Preferably, the body 16 further defines a second opening 22 from the cavity 18 to the exterior of the body 16. The second opening 22 is opposite the first opening 20. Preferably, the body 16 is box shaped, but may be cylindrical, etc. The body 16 may also define a plurality of auxiliary openings 24 transverse to the cavity 18. The auxiliary openings 24 allow optional instruments and tools, such as a part stripper (not shown), part sensor (not shown), mounting brackets (not shown) to be attached to the body 16. Additional auxiliary openings 24 may be included on another surface opposite the auxiliary openings 24 and adjacent the openings 20, 22. A pair of cam holes 26 are defined in the body 16 transverse to and in communication with the cavity 18 for reasons to be discussed below. Preferably, the cam holes 26 are defined opposite each other in the body 16.

Figure 2B:
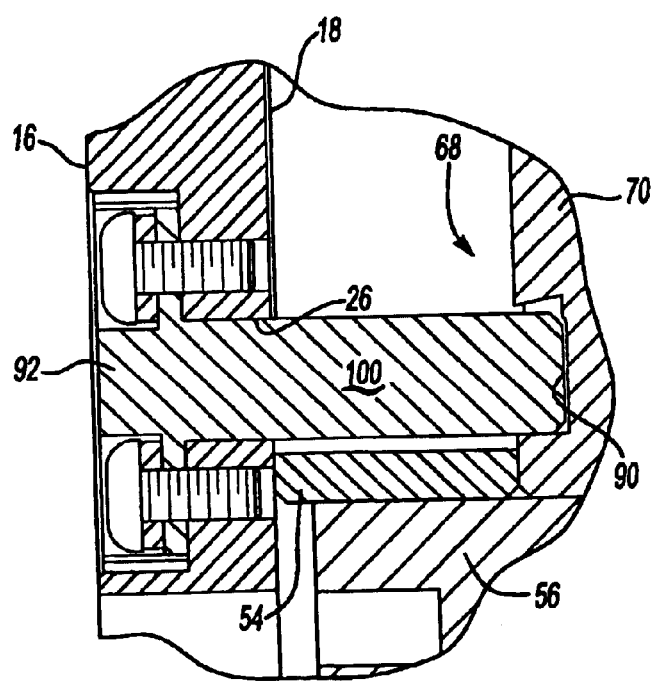
FIG. 2B is an enlarged fragmentary view of a portion of FIG. 2A showing the cam follower including the cam pin extending into the cam slot.
Figure 2A:
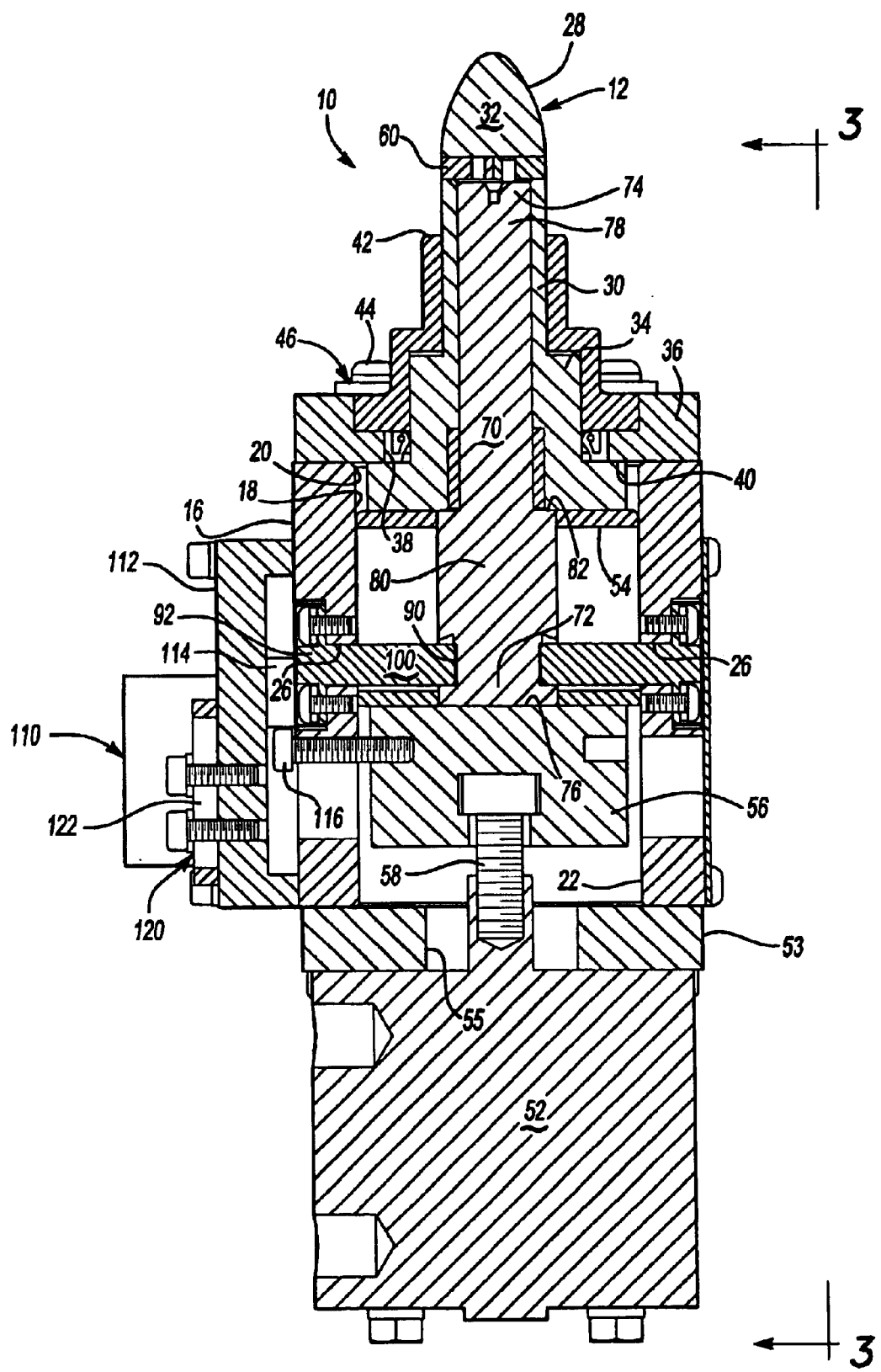
FIG. 2A is a cross-sectional side view of the locating assembly.
Figure 3:
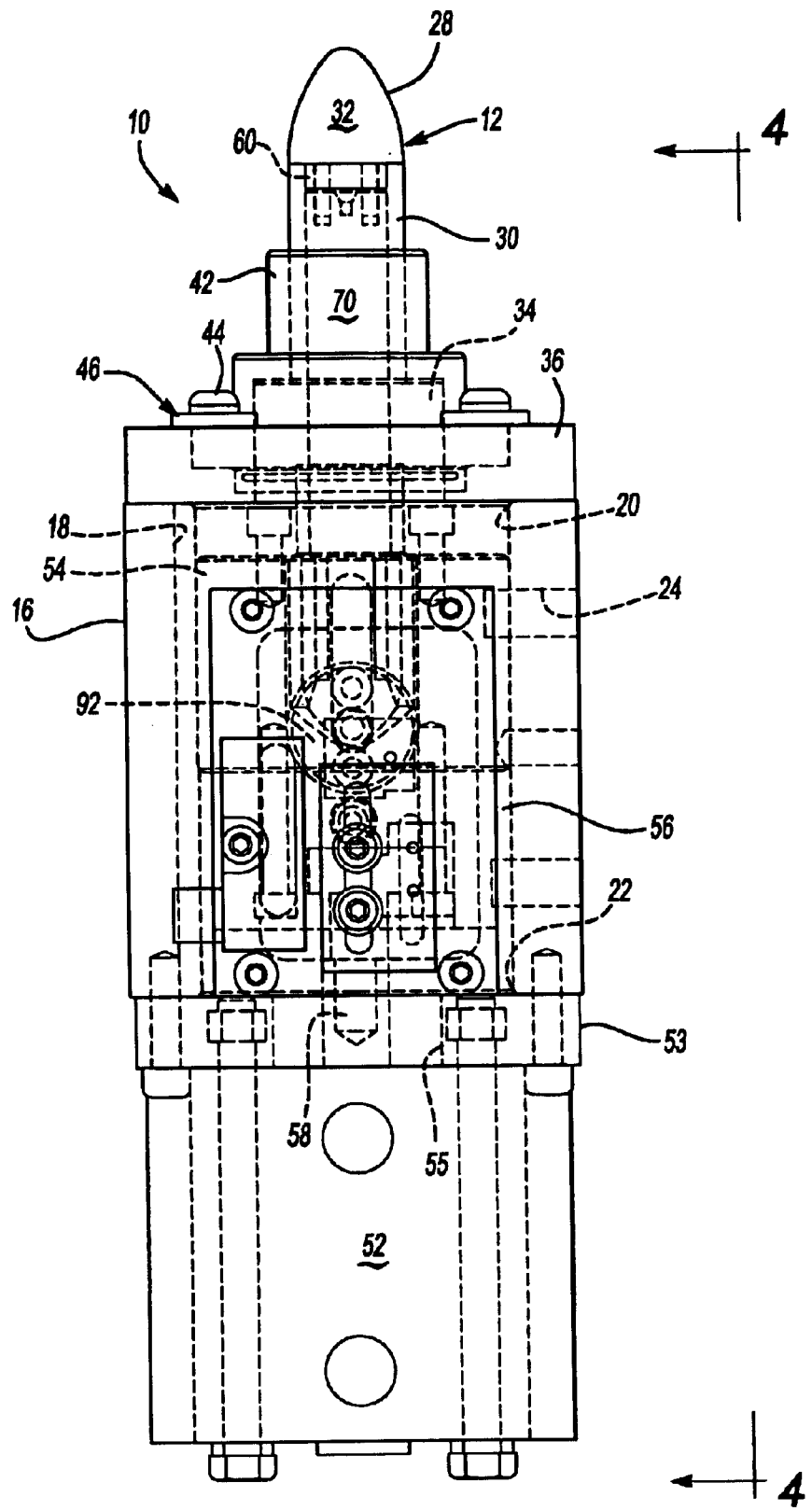
FIG. 3 is a side view of the locating assembly taken along line 3—3 and from the right side of FIG. 2A.
Figure 4:
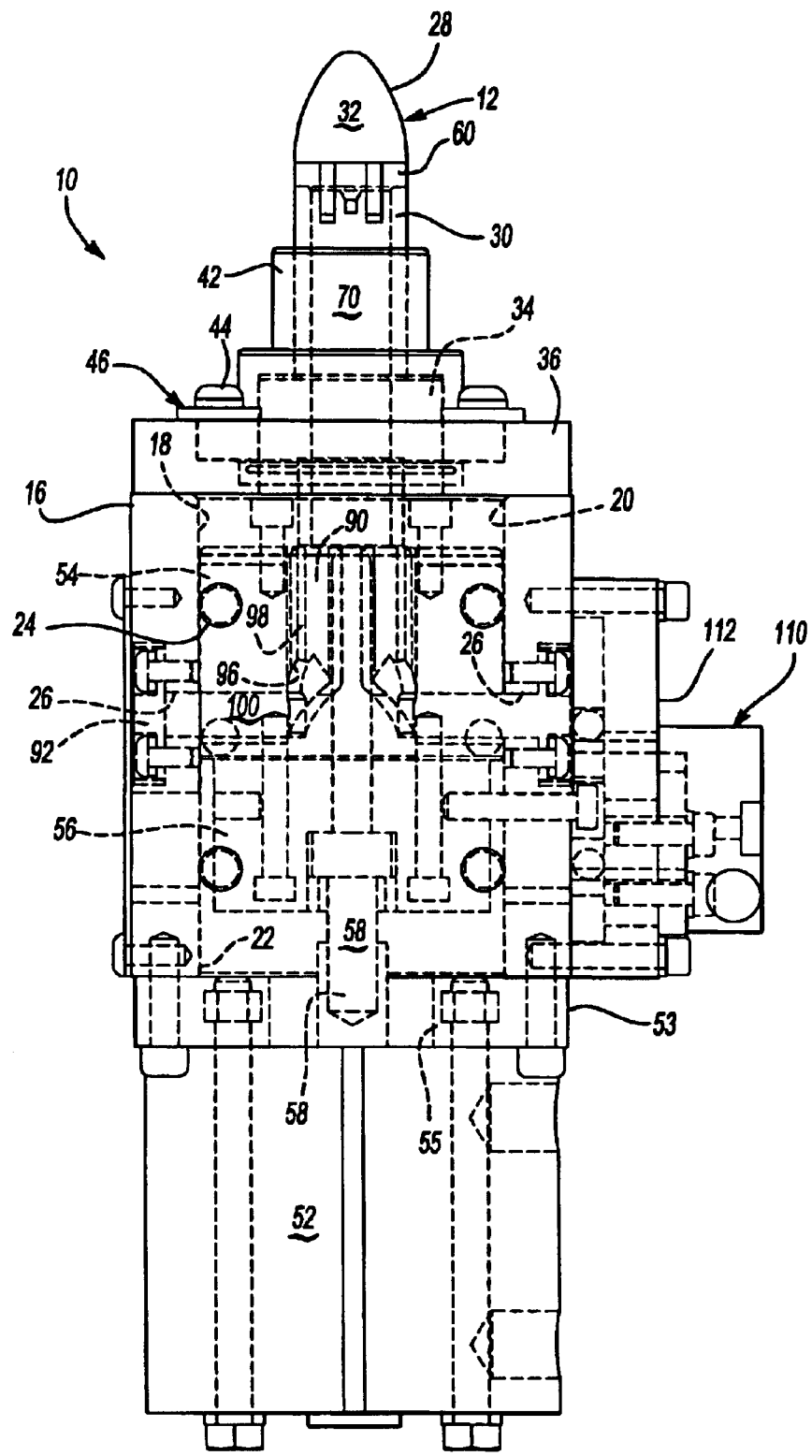
FIG. 4 is a rear view of the locating assembly taken along line 4—4 and from the right side of FIG. 3.

Referring to FIGS. 2A, 3 and 4, the locating pin 12 is disposed in the cavity 18 and extends along an axis A out of the opening 20 to a distal end 28. The locating pin 12 includes a cylindrical portion 30 adjacent to the body 16 and a bullet-shaped portion 32 opposite the body 16. The bullet-shaped portion 32 centers the work piece 14 on the locating pin 12. More specifically, the bullet-shaped portion 32 centers the locating hole in the work piece 14 to position the work piece 14 in preparation for work to be performed on the work piece 14.

The locating pin 12, shown in more detail in FIG. 8, also includes a pin mount 34. The pin mount 34, among other purposes to be described below, holds the locating pin 12 to the piston 54 and prevents the locating pin 12 from being removed from the cavity 18 by abutting the body cap 36 about the opening 20. Preferably, as shown in FIG. 2A, a body cap 36 is mounted to the body 16. The body cap 36 is coaxial with the opening 20 and defines a corresponding opening 38 smaller in width than the opening 20. Thus, the body cap 36 provides an annular ledge 40 overlapping the opening 20. The locating pin 12 extends out of the opening 20 and through the corresponding opening 38 in the body cap 36. The pin mount 34 abuts the body cap 36 at the annular ledge 40 to retain the locating pin 12 in the cavity 18.

Preferably, as shown in FIGS. 1A, 2A, 3, and 4, an annular ring 42 is disposed about the locating pin 12 and mounted to the body cap 36. More specifically, the annular ring 42 is mounted to the body cap 36 opposite to the body 16 and coaxial with the openings 20, 38. Preferably, fasteners 44 connect the body cap 36 to the body 16. The fasteners 44 include D-shaped washers 46 that overlap the annular ring 42 to hold the annular ring 42 onto the body cap 36. The annular ring 42 abuts a surface 48 of the work piece 14 about the locating pin 12. The annular ring 42 may be removed, remachined, and replaced with another annular ring 42 to accommodate work pieces 14 of various thickness and contour. To remove the annular ring 42, the fasteners 44 are loosened and the D-shaped washers 46 are rotated to bring a flat portion 50 of the washers 46 adjacent to the annular ring 42 such that the washers 46 no longer overlap the annular ring 42. The annular ring 42 is removed and reworked or replaced with another annular ring 42 and is placed back on the locating assembly 10, and the washers 46 are rotated back to overlap the other annular ring 42. Through replacement of the annular ring 42, the locating assembly 10 is adjustable to provide, in combination with components described below, an ideal clamping force on work pieces 14 of various thickness and contour. Thus, when multiple locating assemblies 10 are used to hold the work piece 14, each assembly 10 may be adjusted to provide a uniform clamping force on the work piece 14.

Figure 13:
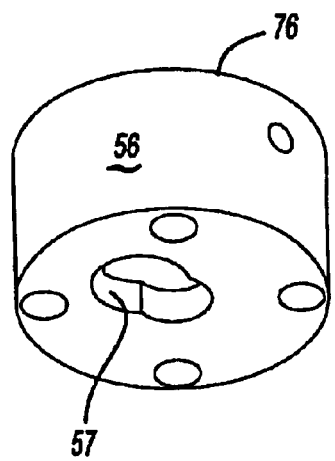
FIG. 13 is a perspective view of the coupler plate.

An actuator 52, shown schematically throughout the figures, is mounted to the body 16 at the second opening 22. Preferably, an actuator mounting plate 53 is disposed between the body and the actuator for mounting the actuator to the body. The mounting plate 53 also acts as an electrical insulator to protect the actuator 52. The actuator mounting plate 53 is coaxial with the second opening 22 and defines a second corresponding opening 55 smaller in width than the second opening 22. The actuator 52 is connected to the locating pin 12 through the pin mount 34 for rectilinearly moving the locating pin 12 along the axis A. More specifically, a piston 54 is disposed in the cavity 18. The piston 54 is connected to the pin mount 34 opposite the locating pin 12. A coupler plate 56 is also disposed in the cavity 18 and is connected to the piston 54 opposite the pin mount 34. The coupler plate 56 also acts as an electrical insulator to protect the actuator 52. A coupler 58 is connected to the actuator 52 through the second opening 22 and the second corresponding opening 55 and extends into the cavity 18. The coupler 58 is connected to the coupler plate 56 opposite the actuator 52. As shown in FIG. 13, the coupler plate 56 defines a key slot 57 for receiving the coupler 58. Referring again to FIGS. 1A, 2A, 3, and 4, the coupler 58 is free-floating in the key slot 57. The key slot 57 aids in maintenance of the locating assembly by allowing the coupler 58 to be removed from the key slot 57, allowing the actuator 52 to be removed from the locating assembly 10. The locating pin 12, piston 54, coupler plate 56, and coupler 58 move rectilinearly along the axis A in response to the rectilinear movement provided by the actuator 52. The rectilinear movement of the actuator 52 provides a clamping force through the locating pin 12 and onto the work piece 14 to hold the work piece 14 on the locating assembly 10.

A pair of fingers 60 are supported by the locating pin 12 adjacent the distal end 28. The two fingers 60 are disposed on opposite sides of the axis A. By supporting the fingers 60 with the locating pin 12, the fingers 60 are fatigue resistant and require little maintenance, thus streamlining manufacturing operations. Preferably, the fingers 60 are supported by the cylindrical portion 30 proximal to the bullet-shaped portion 32 for spacing the fingers 60 from the body 16. The fingers 60 are disposed in the cylindrical portion 30 because of space considerations within the locating pin 12, thus providing a minimal gap all around the fingers 60. Preferably, the fingers 60 are also disposed as close to the bullet-shaped portion 32 as possible to allow a maximum distance between the body 16 and the fingers 60. The maximum distance between the fingers 60 and the body 16 allows the locating assembly 10 to accommodate a greater range of work pieces 14 having various thicknesses than if the fingers 60 were positioned closer to the body 16.

Referring to FIG. 7, the fingers 60 each include a slot 64. The slots 64 extends across the radial path of movement of the fingers 60, respectively. As shown in FIG. 7, the cylindrical portion 30 of the locating pin 12 defines perforations 67. The fingers 60 are movable radially into and out of the locating pin 12 through the perforations 67, transversely to the axis A of the locating pin 12. As shown in FIGS. 5A and 6A, the fingers 60 are completely retractable into the locating pin 12 so that a maximum diameter $d_1$ of the locating pin 12 and the fingers 60 is equal to a diameter of the locating pin 12. Thus, the work piece 14 may be centered on and removed from the locating pin 12 without catching on the fingers 60.

During operation, as shown in FIGS. 5B and 6B, the fingers 60 are moved radially out of the locating pin 12 such that a combined diameter $d_2$ of the extended fingers 60 is greater than the diameter $d_1$ of the locating pin 12. The fingers 60 contact the work piece 14 as the locating pin 12 is moved rectilinearly toward the work piece 14. The actuator 52 provides the clamping force of the fingers 60 on the work piece 14 through the rectilinear movement of the locating pin 12. The work piece 14 is held between the fingers 60 and the annular ring 42. The locating assembly 10, by combining the radial movement of the fingers 60 through the locating pin 12 simultaneously with the rectilinear movement of the locating pin 12, works fast, efficiently, precisely, and uniformly to hold the work piece 14. A mechanism 68, to be described in detail below, rotates in response to the rectilinear movement of the locating pin 12 to move the fingers 60 radially.

The mechanism 68 includes a central post 70 disposed between the actuator 52 at a first end 72 and the fingers 60 at a second end 74. More specifically, the central post 70 is disposed between the coupler plate 56 at the first end 72 and the fingers 60 at the second end 74. The central post 70 rests on a surface 76 of the coupler plate 56, which rectilinearly moves the central post 70 in response to the rectilinear movement of the actuator 52. The central post 70 rotates in response to the rectilinear movement. The surface 76 of the coupler plate 56 in contact with the central post 70 functions as a thrust bearing to facilitate the rotational movement of the central post 70. The central post 70 extends through and is independent from the piston 54 for separating the rotational movement of the central post 70 from the rectilinear movement of the locating pin 12. The central post 70 includes a top portion 78 and a bottom portion 80. The bottom portion 80 has a greater diameter than the top portion 78 to present a ledge 82. The ledge 82 abuts the pin mount 34. Thus, as the actuator 52 rectilinearly moves the locating pin 12 toward the body cap 36, the pin mount 34 contacts the ledge 82 to move the central post 70 rectilinearly with the locating pin 12. As the actuator 52 moves the locating pin 12 rectilinearly away from the body 16, the coupler plate 56 moves the central post 70 along with the piston 54.

A motion converter 84 converts the rotational movement of the central post 70 into radial movement of the fingers 60. As shown in FIG. 7, the converter 84 includes the slots 64 in each of the fingers 60 and dowels 86 extending axially from the second end 74 of the central post 70 and into each of the slots 64, respectively. The dowels 86 are offset from the axis A for radially moving the fingers 60 in response to rotational movement of the central post 70. It is to be understood that only one finger 60 is necessary, wherein only one dowel 86 extends into the slot 64 to radially move the finger 60.

The rotational movement of the central post 70 moves the dowels 86 along an arcuate path. As the dowels 86 move through the respective slots 64, which are straight, the dowels 86 forces the fingers 60 to move radially to maintain the slots 64 in alignment with the dowels 86. For example, as shown in FIGS. 6A and 6B, the dowels 86 begin at an end of the respective slots 64. The dowels 86 move along the arcuate path toward the middle of the slots 64 and move the fingers 60 radially away from the axis A to maintain the slots 64 in alignment with the dowels 86.

Referring to FIG. 2B, a pair of cams 90 and corresponding cam followers 92 interconnect the central post 70 and the body 16 for rotating the central post 70 in response to the rectilinear movement of the locating pin 12. The pair of cams 90 and the corresponding cam followers 92 are disposed on opposite sides of the axis A. The pair of cams 90 and corresponding cam followers 92 stabilize the central post 70 to allow the central post 70 to rotate smoothly within the cavity 18. Preferably, the cams 90 are disposed in the central post 70 and the cam followers 92 are mounted to the body 16. As best shown in FIGS. 9 and 10, the cams 90 are defined by cam slots 94. The cam slots 94 are defined in first portions 96 beginning proximal to the first end 72 of the central post 70. The first portions 96 extend around the central post 70 toward the second end 74. Preferably, the first portions 96 have a helical shape. The cam slots 94 are further defined in second portions 98 continuing from the first portions 96. The second portions 98 are distal to the first end 72 and extend axially straight toward the second end 74.

Figure 12:
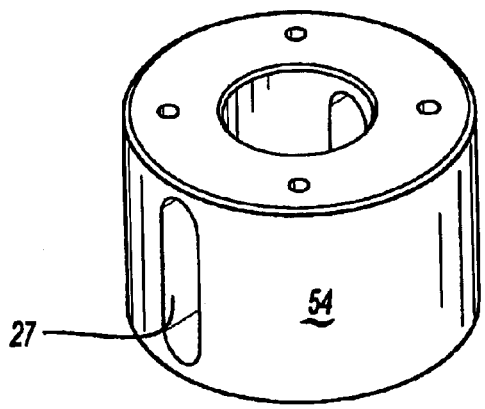
FIG. 12 is a perspective view of the piston.

The cam followers 92 comprise cam pins 100, which are slidably disposed in the respective cam slots 94. Preferably, the cam followers 92 are mounted to the body 16 and the cam pins 100 are inserted into the cavity 18 through the respective cam holes 26. As shown best in FIG. 12, the piston 54 defines piston cam slots 27. The piston cam slots 27 allow the cam pins 100 to extend into the cavity 18 without affecting the rectilinear movement of the piston 54. The cam pins 100 extend into the respective cam slots 94 and guide the central post 70 as the central post 70 moves rectilinearly, as further described below.

During operation, the cam pins 100 begin at an end of the first portions 96 distal to the second portions 98. As the actuator 52 rectilinearly moves the locating pin 12 downward along the axis A, as shown in FIG. 5B, the first portions 96 move along the cam pins 100, respectively, and rotate the central post 70 to extend the fingers 60 out of the locating pin 12. The helical shape of the first portions 96 facilitates smooth movement of the cam pins 100 through the first portions 96. The cam slots 94 continue to move along the cam pins 100, respectively, from the first portions 96 to the second portions 98. The second portions 98 move along the cam pins 100 and maintain the central post 70 in position, with the fingers 60 extended, while the central post 70 continues to rectilinearly move along the axis A with the locating pin 12 to provide the clamping force on the work piece 14.

Preferably, a switch 110 is mounted to the body 16 for detecting a position of the locating pin 12. The switch 110 includes a switch housing 112 that contains various components of the switch 110. An upper sensor 114 is maintained in a constant position within the switch housing 112. Tripping of the upper sensor 114 indicates that the locating pin 12 is in an "up" position, with the fingers 60 retracted inside the locating pin 12. The switch 110 further includes a trip screw 116 that is mounted to the coupler plate 56. The body 16 defines a switch slot 118. The trip screw 116 extends through the switch slot 118 and into the switch housing 112. More specifically, the trip screw 116 is mounted to the coupler plate 56 for tripping the upper sensor 114. An adjustment mechanism 120 allows the switch 110 to be calibrated. The adjustment mechanism 120 includes an adjustable plate 122 that contains a lower sensor 124. To calibrate the switch 110, the work piece 14 is placed on the locating assembly 10. The locating pin 12 is rectilinearly moved toward the work piece 14 to extend the fingers 60. The fingers 60 are brought into contact with the work piece 14. The adjustable plate 122 is adjusted such that the lower sensor 124 is tripped by the trip screw 116 when the fingers 60 are in contact with the work piece 14, indicating a "clamped" position. Thus, the switch 110 indicates when the locating pin 12 is in the up or clamped position depending on the position of the trip screw 116. The up or clamped position indication, among other uses, is particularly useful on an assembly line to prevent a separate machine from performing work on the work piece 14 without an indication of the locating pin 12 in the clamped position.

Obviously, many modifications and variations of the present invention are possible in light of the above teachings. The invention may be practiced otherwise than as specifically described within the scope of the appended claims. In addition, the reference numerals in the claims are merely for convenience and are not to be read in any way as limiting.

What is claimed is:

1. A locating and clamping assembly comprising:

a body defining an internal cavity and an opening from said cavity to the exterior of said body;

a locating pin disposed in said cavity and extending along an axis A out of said opening to a distal end;

an actuator for moving said locating pin rectilinearly along said axis A into and out of said opening;

at least one finger supported by said locating pin adjacent said distal end;

said assembly characterized by a mechanism for moving said finger along a straight line into and out of said locating pin perpendicular to said axis A in response to said rectilinear movement of said locating pin.

2. An assembly as set forth in claim 1 wherein said mechanism comprises a central post disposed in and movable with said locating pin and extending between said actuator at a first end and said finger at a second end for moving said finger along the straight line.

3. An assembly as set forth in claim 2 wherein said mechanism further comprises a converter for translating movement of said central post into movement of said finger along the straight line.

4. An assembly as set forth in claim 2 wherein said mechanism further comprises a cam and a cam follower interconnecting said central post and said body for rotating said central post in response to said rectilinear movement of said locating pin.

5. An assembly as set forth in claim 4 wherein said mechanism further comprises a converter for translating movement of said central post into movement of said finger along the straight line.

6. An assembly as set forth in claim 5 wherein said finger defines a slot extending across the radial path of movement of said finger and said converter comprises said slot and a dowel extending axially from said second end of said central post and into said slot, said dowel offset from said axis A for radially moving said finger in response to rotational movement of said central post.

* * * * *